United States Patent [19]

Billiani et al.

[11] Patent Number: 5,698,625

[45] Date of Patent: Dec. 16, 1997

[54] PROCESS FOR THE PREPARATION OF WATER-DILUTABLE AIR-DRYING COATING BINDERS, AND THE USE THEREOF

[75] Inventors: Johann Billiani; Michael Gobec, both of Graz, Austria

[73] Assignee: Vianova Resins Aktiengesellschaft, Werndorf, Austria

[21] Appl. No.: 716,318

[22] PCT Filed: Apr. 6, 1995

[86] PCT No.: PCT/AT95/00071

§ 371 Date: Oct. 3, 1996

§ 102(e) Date: Oct. 3, 1996

[87] PCT Pub. No.: WO95/27762

PCT Pub. Date: Oct. 19, 1995

[30] Foreign Application Priority Data

Apr. 7, 1994 [AT] Austria ........................................ 711/94

[51] Int. Cl.$^6$ .................................................. C08L 67/00
[52] U.S. Cl. .................................................. 524/513
[58] Field of Search .................................................. 524/513

[56] References Cited

FOREIGN PATENT DOCUMENTS 0 267 562   5/1988   European Pat. Off. .

*Primary Examiner*—Edward J. Cain
*Attorney, Agent, or Firm*—Foley & Lardner

[57] ABSTRACT

The invention concerns a process for preparing water-dilutable, air-drying coating binders based on acryl and vinyl modified alkyd resin emulsions. The latter contain polyoxyalkylene groups introduced via specific (meth)acrylate monomers and are highly suitable as binders for high gloss coating varnishes even without the use of cosolvents.

20 Claims, No Drawings

PROCESS FOR THE PREPARATION OF WATER-DILUTABLE AIR-DRYING COATING BINDERS, AND THE USE THEREOF

BACKGROUND OF THE INVENTION

1. Field of the Invention

The invention relates to a process for the preparation of water-dilutable air-drying coating binders based on acrylic-modified and vinyl-modified alkyd resin emulsions and to their use in the formulation of oxidatively drying coating materials.

2. Description of Related Art

In EP 0267562 A2 (meth)acrylic and/or vinyl monomers containing no reactive groups other than the C—C double bond are polymerized in the presence of an aqueous solution of specific emulsifier resins, which may be alkyd resins, urethane-alkyd resins or epoxy resin esters.

Modified alkyd resins of similar composition are described in EP 0295403 A2, for the preparation of which, in addition to the conventional raw materials, specific fatty acid copolymers are used.

With the products obtained in accordance with EP 0267562 A2 and EP 0295403 A2 it is possible to a large extent to meet the technical coatings requirements of water-dilutable air-drying coating binders with respect to processability and film properties, but to formulate glossy top coats it is still necessary, albeit in small proportions, to use organic solvents, for example glycol ethers.

It has now been found that the alkyd resin emulsions prepared in accordance with EP 0295403 A2, if they additionally contain polyoxyalkylene groups introduced by way of specific (meth) acrylate monomers, are highly suitable, even without the use of "cosolvents", as binders for high-gloss top coats.

SUMMARY OF THE INVENTION

The invention relates accordingly to a process for the preparation of water-dilutable air-drying coating binders based on acrylic-modified and vinyl-modified alkyd resin emulsions, which process is characterized in that A) a monomer mixture containing a1) from 25 to 50% by weight of unsaturated fatty acids, a2) from 10 to 25% by weight of methacrylic acid, a3) from 1 to 15% by weight of (meth) acrylate monomers containing polyoxyalkylene groups, and a4) from 25 to 50% by weight of other (meth) acrylate and/or vinyl monomers containing no functional groups other than the C—C double bond is polymerized in the presence of a free-radical initiator to a conversion of at least 95% by weight, and B) in a further reaction step b1) from 33 to 44% by weight of copolymer (A), b2) from 20 to 42% by weight of unsaturated fatty acids, b3) from 10 to 25% by weight of polyalcohols having 2 to 6 hydroxyl groups, b4) from 10 to 20% by weight of aromatic and/or aliphatic dicarboxylic acids, b5) from 0 to 15% by weight of cyclic and/or polycyclic carboxylic acids, are reacted to form a modified alkyd resin (B), the sums of the percentages for components a1) to a4) and, respectively, b1) to b5) necessarily being 100 in each case, with the proviso that in stage (B) components b2) to b5) are pre-esterified until a clear melt and an acid number of from 3 to 30 mg of KOH/g are reached, said alkyd resin (B), based on the solids content, having a content of from 30 to 70% by weight, preferably from 40 to 60% by weight, of unsaturated fatty acids, an intrinsic viscosity of from 8 to 15 ml/g (chloroform, 20° C.) and an acid number of from 25 to 70 mg of KOH/g, and at least 80% of the corresponding carboxyl groups deriving from methacrylic acid units of the copolymer (A), and the modified alkyd resin (B) thus obtained is emulsified in water without the use of organic solvents.

The invention additionally relates to the use of the coating binders prepared according to this process in the formulation of water-dilutable coating materials which dry oxidatively at temperatures of up to 100° C. and which, even without the addition of organic solvents, give coating films of very good gloss.

DETAILED DESCRIPTION OF PREFERRED EMBODIMENTS

For the preparation of the copolymer (A), the monomers are employed in the proportions indicated in the main claim.

The unsaturated fatty acids (component a1) used are fatty acids having an iodine number of greater than 135 preferably from 160 to 200) and having a predominantly insulated position of the double bonds. Suitable examples are linseed oil fatty acid and safflower fatty acid, if desired as a blend with up to 25% by weight of dehydrated castor oil fatty acid or of a comparable conjuene fatty acid prepared by isomerization.

As (meth) acrylate monomers containing polyoxyalkylene groups (component a3) it is possible to employ (meth) acrylate compounds containing at least three oxyalkylene groups and corresponding to the general structural formula

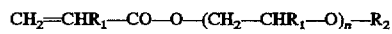

where $R_1$=H, $CH_3$; $R_2$=H, $CH_3$, $C_2H_5$ and n=3 to 45.

Typical examples of such compounds are esters of (meth) acrylic acid with ethylene glycol oligomers and/or propylene glycol oligomers, it being possible for the ethylene glycol and propylene glycol units to be arranged either randomly or in blocks.

The other (meth)acrylate monomers and/or vinyl monomers (component a4), which contain no functional group other than the C—C double bond, are preferably those (meth)acrylic compounds and aromatic vinyl compound which form homopolymers soluble in petroleum spirit.

Suitable such compounds are esters of (meth)acrylic acid with n-butanol, isobutanol, tert-butanol or 2-ethylhexanol, and vinyltoluene. It is also possible, in addition, to use monomers which form polymers which are insoluble in petroleum spirit, such as methyl methacrylate or styrene, in proportions of up to 30% by weight.

The copolymerization is carried out in a known manner in the presence of an appropriate initiator, such as tert-butyl perbenzoate or dibenzoyl peroxide.

In a further reaction step, b1) from 33 to 44% by weight of copolymer (A), b2) from 20 to 42% by weight of unsaturated fatty acids, b3) from 10 to 25% by weight of polyalcohols having 2 to 6 hydroxyl groups, b4) from 10 to 20% by weight of aromatic and/or aliphatic dicarboxylic acids, b5) from 0 to 15% by weight of cyclic and/or polycyclic carboxylic acids, are reacted to give a water-dilutable alkyd resin (B), in which context the overall proportion of the unsaturated fatty acids in the end product which derive from components b1) and b2) should be from 30 to 70% by weight, preferably from 40 to 60% by weight, and the sum of the percentages for components b1) to b5) must in turn be 100.

As unsaturated fatty acids (component b2) it is possible in this stage to employ vegetable and animal fatty acids having an iodine number of greater than 120. Preferably, some of the double bonds should be in conjugated position. Soya fatty acid, linseed oil fatty acid, safflower oil fatty acid, tall oil fatty acid and ricinenic fatty acid are suitable.

As polyols (component b3) and dicarboxylic acids (component b4) for the preparation of the alkyd resins, particularly suitable products are those which enter into ester linkages which are as far as possible stable to hydrolysis, examples being trimethylolpropane, pentaerythritol and sorbitol as polyols, and isophthalic acid or terephthalic acid as dicarboxylic acids.

In order to regulate the film hardness use is optionally made, as component b5), of cyclic or polycyclic monocarboxylic acids, such as benzoic acid or resin acids.

Components b2) to b5) are pre-esterified until a clear melt and an acid number of from 3 to 30 mg of KOH/g are reached. Following the addition of the copolymer (A), the esterification is carried out up to an intrinsic viscosity of from 8 to 15 ml/g (chloroform, 20° C.) and an acid number of from 25 to 70 mg of KOH/g, the final value of the acid number being chosen such that it corresponds to a least 80%, in practice up to about 90%, of the concentration of the carboxyl groups which derive from the methacrylic acid. Since these acid groups have a tertiary position in the copolymer chains and are therefore sterically hindered, it can be assumed that they undergo esterification substantially more slowly than the other carboxyl groups and constitute the major proportion of the free acid groups after the end of the reaction.

The alkyd resins prepared in accordance with the invention are freed from residual inert organic solvents under reduced pressure. The aqueous emulsion is prepared without the use of "cosolvents", with organic amines and alkali metal hydroxides, in addition to the preferred ammonia, being suitable for neutralizing the acid groups.

The pigments, fillers and auxiliaries, such as siccatives, antiskinning agents, antisettling agents, defoamers, etc., which are used to prepare water-dilutable air-drying coating materials are known to the person skilled in the art or can be taken from the relevant literature.

The coating materials are expediently prepared by mixing the emulsion with the pigments and additives and dispersing the mixture in a milling apparatus.

In addition to brush application, the coating materials can also be applied by spraying, dipping or flow coating. Drying takes place, if appropriate, at temperatures of up to about 100° C.

The examples which follow illustrate the invention without limiting its scope. All parts or percentages relate, unless stated otherwise, to units by weight. The intrinsic viscosities (IVs) indicated were determined in chloroform at 20° C. and are stated in ml/g.

1. Examples 1 to 4 and Comparison Example V 1.1. Preparation of the copolymers (A1) to (A4) and (VA)

The fatty acid and xylene are heated at 135° to 140° C. At this temperature, the monomer mixture and the peroxide mixture are added at a uniform rate over the course of from 6 to 9 hours. After the end of the addition, the reaction temperature is maintained until determination of the residue indicates a polymerization conversion of at least 95%. If the progress of the reaction is too slow, this is corrected with peroxide. The proportions of these starting products and the acid numbers of the copolymers, based on solids, are summarized in Table 1. The Comparison example (VA) is identical with the copolymer C1 from EP 0267562 A2 and EP 0295402 A2.

1.2. Preparation of the modified alkyd resins (B1) to (B4) and (VB)

In accordance with the data in Table 2, the components from portion 1 are preesterified at 230° C. until a clear melt and an acid number of from 3 to 30 mg of KOH/g are obtained. Following the addition of portion 2, the reaction mixture is held at 200° C. until the desired end values have been reached. The Comparison Example (VB) corresponds to the alkyd resin A1 from EP 0295402 A2.

1.3. Emulsification of the modified alkyd resins (B1) to (B4) and (VB)

100 parts of alkyd resin (based on solids) are emulsified, after removing the organic solvent which has remained (from the copolymer), at 70° C. with an aqueous $NH_3$ solution (150 parts of water and about 5 parts of $NH_3/25\%$ strength in water). This produces milky to transparent emulsions having a pronounced pseudoplasticity, a pH of from 8.2 to 8.6 and a solids content of about 40% by weight.

TABLE 1

|  | (A1) | (A2) | (A3) | (A4) | (VA) |
|---|---|---|---|---|---|
| Linseed oil fatty acid | 31 | 28 | 22 | 33 | 30 |
| Isomerized linoleic acid[1] |  | 2 |  | 5 |  |
| Safflower fatty acid |  | 5 |  |  |  |
| Xylene | 5 | 5 |  |  | 5 |
| Monomer mixture: |  |  |  |  |  |
| Isobutyl methacrylate | 25 | 26 | 36 | 25 | 32 |
| Vinyltoluene | 6 |  | 8 | 3 | 6 |
| Methyl methacrylate |  |  | 1 |  |  |
| Styrene |  |  | 3 | 2 |  |
| Ethyltriethylene glycol methacrylate | 7 | 2 | 12 | 1 |  |
| PPM5S[2] |  | 6 |  |  |  |
| MPEG 350[3] |  |  |  | 2 |  |
| Methacrylic acid | 21 | 24 | 13 | 20 | 21 |
| Peroxide mixture: |  |  |  |  |  |
| Linseed oil fatty acid | 10 | 7 | 5 | 9 | 11 |
| tert-Butyl perbenzoate | 2 | 3 | 3 | 2 | 3 |
| Peroxide correction: |  |  |  |  |  |
| Dibenzoyl peroxide 50% strength | 1 | 1 | 1 | 1 | 1 |
| Xylene | 5 | 5 | 10 | 10 | 5 |
| Acid number [mg of KOH/g] | 209 | 231 | 135 | 213 | 209 |

[1]about 50% 9,11-linoleic acid
[2]pentapropylene glycol methacrylate
[3]methoxy-polyethylene glycol 350 methacrylate

TABLE 2

|  | (B1) | (B2) | (B3) | (B4) | (VB) |
|---|---|---|---|---|---|
| Portion 1 |  |  |  |  |  |
| Safflower fatty acid | 231 |  |  |  | 231 |
| Isomerized linoleic acid | 127 | 162 | 130 | 153 | 127 |
| Soya fatty acid |  | 238 | 152 | 60 |  |
| Trimethylol propane |  | 43 |  | 235 |  |
| Pentaerythritol | 133 | 108 | 108 |  | 133 |
| Isophthalic acid | 116 | 103 | 100 | 176 | 116 |
| Benzoic acid |  |  | 76 |  |  |

TABLE 2-continued

|  | (B1) | (B2) | (B3) | (B4) | (VB) |
|---|---|---|---|---|---|
| Portion 2 (solids) | | | | | |
| (A1) | 393 | | | | |
| (A2) | | 346 | | | |
| (A3) | | | 434 | | |
| (A4) | | | | 376 | |
| (VA) | | | | | 393 |
| IV [ml/g] | 12.5 | 13.5 | 11.5 | 9.5 | 12.3 |
| Acid number [mg of KOH/g] | 48 | 44 | 33 | 55 | 45 |

1.4. Preparation of water-dilutable coating materials

The alkyd resin emulsions are used in a known manner by milling on a stirred-ball mill (type Dyno-Mill), to prepare white paint in the following formulation:
250 of resin emulsion, 40% strength
1.5 of ammonia solution, 25% strength in water
100 of TiO$_2$, rutile type
1 of combination dryer, water-dilutable
2 of antiskinning agent (oxime)
1 of antifoam (silicone-free)
30 of water The paints, if appropriate after establishing a pH of 8.8–9.1 and dilution to the application viscosity, are applied to metal panels and, after air drying at room temperature for 24 hours, are assessed visually for gloss and cloudiness.

The white paints formulated with the alkyd resin emulsions prepared in accordance with the invention exhibit a very good gloss. The comparison white paint exhibits a lower degree of gloss and a distinct cloudiness.

What is claimed is:

1. Process for the preparation of water-dilutable air-drying coating binders based on acrylic-modified and vinyl-modified alkyd resin emulsions, characterized in that
A) monomer mixture containing
   a1) from 25 to 50% by weight of unsaturated fatty acids,
   a2) from 10 to 25% by weight of methacrylic acid,
   a3) from 1 to 15% by weight of (meth)acrylate monomers containing polyoxyalkylene groups, and
   a4) from 25 to 50% by weight of other (meth) acrylate and/or vinyl monomers containing no functional groups other than the C—C double bond
is polymerized in the presence of a free-radical initiator to a conversion of at least 95% by weight, and
B) in a further reaction step
   b1) from 33 to 44% by weight of copolymer (A),
   b2) from 20 to 42% by weight of unsaturated fatty acids,
   b3) from 10 to 25% by weight of polyalcohols having 2 to 6 hydroxyl groups,
   b4) from 10 to 20% by weight of aromatic and/or aliphatic dicarboxylic acids,
   b5) from 0 to 15% by weight of cyclic and/or polycyclic carboxylic acids,
are reacted to form a modified alkyd resin (B), the sums of the percentages for components a1) to a4) and, respectively, b1) to b5) necessarily being 100 in each case, with the proviso that in stage (B) components b2) to b5) are pre-esterified until a clear melt and an acid number of from 3 to 30 mg of KOH/g are reached, said alkyd resin (B), based on the solids content, having a content of from 30 to 70% by weight, of unsaturated fatty acids, an intrinsic viscosity of from 8 to 15 ml/g (chloroform, 20° C.) and an acid number of from 25 to 70 mg of KOH/g, and at least 80% of the corresponding carboxyl groups deriving from methylacrylic acid units of the copolymer (A), and the modified alkyd resin (B) thus obtained is emulsified in water without the use of organic solvents.

2. The process according to claim 1, wherein component (a3) comprises (meth)acrylate monomers containing at least three oxyalkylene groups corresponding to the general structural formula

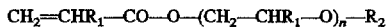

$$CH_2=CHR_1-CO-O-(CH_2-CHR_1-O)_n-R_2$$

where R$_1$ is selected from H and CH$_3$; R$_2$ is selected from H, CH$_3$ and C$_2$H$_5$; and n is from 3 to 45.

3. A method of making a water-dilutable coating composition that dries oxidatively at temperatures of up to 100° C., comprising mixing a water-dilutable air-drying coating binder prepared in accordance with claim 1 with additives and dispersing the mixture in a milling apparatus.

4. A method of making a water-dilutable coating composition that dries oxidatively at temperatures of up to 100° C., comprising mixing a water-dilutable air-drying coating binder prepared in accordance with claim 2 with at least one additive and dispersing the mixture in a milling apparatus.

5. The method as claimed in claim 3, wherein the additive is one or more ingredient selected from the group consisting of pigments, fillers, auxiliaries, siccatives, antiskinning agents, antisetting agents and defoaming agents.

6. The method as claimed in claim 4, wherein the additive is one or more ingredient selected from the group consisting of pigments, fillers, auxiliaries, siccatives, antiskinning agents, antisetting agents and defoaming agents.

7. A water-dilutable air-drying coating binder prepared in accordance with the process of claim 1.

8. A water-dilutable air-drying coating binder prepared in accordance with the process of claim 2.

9. The process according to claim 1, wherein the alkyd resin (B) is based on the solids content having a content of from 40 to 60% by weight of unsaturated fatty acids.

10. The process according to claim 1, wherein at least 90% of the corresponding carboxyl groups deriving from methacrylic acid units of the copolymer (A), and the modified alkyd resin (B) thus obtained is emulsified in water without the use of organic solvents.

11. The process according to claim 1, wherein component a4) is a (meth)acrylic compound and/or vinyl compound that forms a homopolymer soluble in petroleum spirit selected from esters of (meth)acrylic acid and vinyltoluene.

12. The process according to claim 1, wherein component a1) is a fatty acid having an iodine number of greater than 135.

13. The process according to claim 12, wherein the iodine number is from 160 to 200.

14. The binder according to claim 7, wherein the alkyd resin (B) is based on the solids content having a content of from 40 to 60% by weight of unsaturated fatty acids.

15. The binder according to claim 7, wherein at least 90% of the corresponding carboxyl groups deriving from methacrylic acid units of the copolymer (A), and the modified alkyd resin (B) thus obtained is emulsified in water without the use of organic solvents.

16. The binder according to claim 7, wherein component a4) is a (meth)acrylic compound and/or vinyl compound that forms a homopolymer soluble in petroleum spirit selected from esters of (meth)acrylic acid and vinyltoluene.

17. The binder according to claim 7, wherein component a1) is a fatty acid having an iodine number of greater than 135.

18. The method according to claim 3, wherein the alkyd resin (B) is based on the solids content having a content of from 40 to 60% by weight of unsaturated fatty acids.

19. The method according to claim 3, wherein at least 90% of the corresponding carboxyl groups deriving from methacrylic acid units of the copolymer (A), and the modified alkyd resin (B) thus obtained is emulsified in water without the use of organic solvents.

20. The method according to claim 3, wherein component a4) is a (meth)acrylic compound and/or vinyl compound that forms a homopolymer soluble in petroleum spirit selected from esters of (meth)acrylic acid and vinyltoluene.

* * * * *